United States Patent [19]

Jenkins

[11] Patent Number: 4,973,809
[45] Date of Patent: Nov. 27, 1990

[54] CUTTING AND GOUGING ELECTRODE

[76] Inventor: Henry H. Jenkins, 220 N. Smith Ave., Corona, Calif. 91720

[21] Appl. No.: 426,191

[22] Filed: Oct. 25, 1989

Related U.S. Application Data

[63] Continuation of Ser. No. 926,197, Nov. 3, 1986, abandoned.

[51] Int. Cl.⁵ .................. B23K 35/02; B23K 35/06; B23K 9/00
[52] U.S. Cl. ........................... 219/70; 219/74
[58] Field of Search .............. 219/69.1, 69.15, 70, 219/74, 75; 266/48

[56] References Cited

U.S. PATENT DOCUMENTS

| 2,427,588 | 9/1947 | Burnett | 219/69.15 |
|---|---|---|---|
| 2,462,463 | 2/1949 | Boot | 219/70 |
| 2,510,960 | 6/1950 | Danhier | 219/69.15 |
| 2,544,711 | 3/1951 | Mikhalapov | 219/74 |
| 2,864,934 | 12/1958 | Bernard et al. | 219/74 |
| 3,050,616 | 8/1962 | Gage | 219/69.1 |
| 3,239,648 | 3/1966 | Syrigos | 219/74 |
| 3,342,416 | 9/1967 | Presley | 226/48 |
| 3,458,681 | 7/1969 | Wilson | 219/74 |
| 3,470,345 | 9/1969 | Vaillancourt | 219/70 |
| 3,624,339 | 11/1971 | Jenkins | 219/70 |
| 4,069,407 | 1/1978 | Brower | 219/70 |
| 4,109,131 | 8/1978 | Schluter | 219/75 |
| 4,173,499 | 11/1979 | Hölemann | 266/48 |
| 4,182,947 | 1/1988 | Brower | 219/70 |
| 4,393,297 | 7/1983 | Niinivaara | 219/70 |
| 4,401,040 | 8/1983 | Dobi | 266/48 |
| 4,416,444 | 11/1983 | Brower | 266/48 |
| 4,437,649 | 3/1984 | Rieppel et al. | 266/48 |
| 4,464,555 | 8/1984 | Wallis | 219/70 |
| 4,492,850 | 1/1985 | Yasuda et al. | 219/69.15 |
| 4,527,037 | 7/1985 | Johnson et al. | 219/69.1 |
| 4,541,616 | 9/1985 | Dean | 266/48 |
| 4,675,493 | 6/1987 | Gartland et al. | 219/74 |

FOREIGN PATENT DOCUMENTS

| 2313813 | 10/1973 | Fed. Rep. of Germany | 219/69.15 |
|---|---|---|---|
| 144630 | 9/1982 | Japan | 219/69.15 |

Primary Examiner—A. D. Pellinen
Assistant Examiner—Geoffrey S. Evans
Attorney, Agent, or Firm—Woodling, Krost and Rust

[57] ABSTRACT

An improved electrode construction for use in cutting and gouging where air under high pressure is used to blow away molten metal. The improvement in a structure where a carbon is employed with a covering surrounding the carbon with an air passage formed at least in part by the covering. The air passage transmits high pressure air to the area where the cutting and/or gouging takes place.

11 Claims, 3 Drawing Sheets

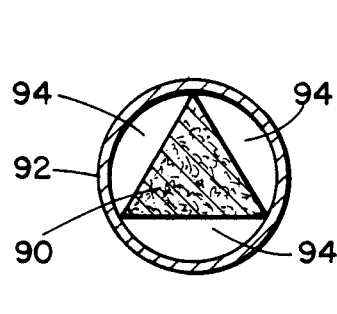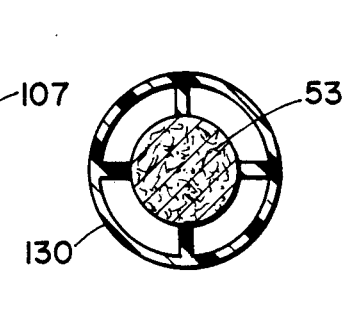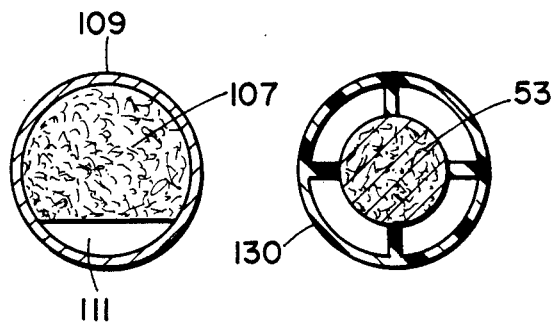
FIG. 11   FIG. 12   FIG. 13
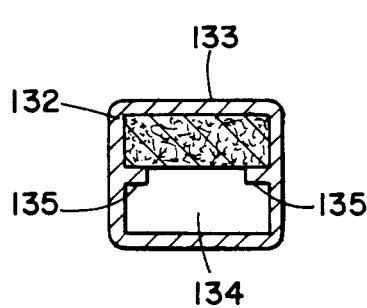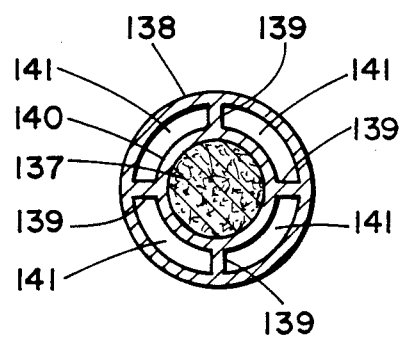
FIG. 14   FIG. 16
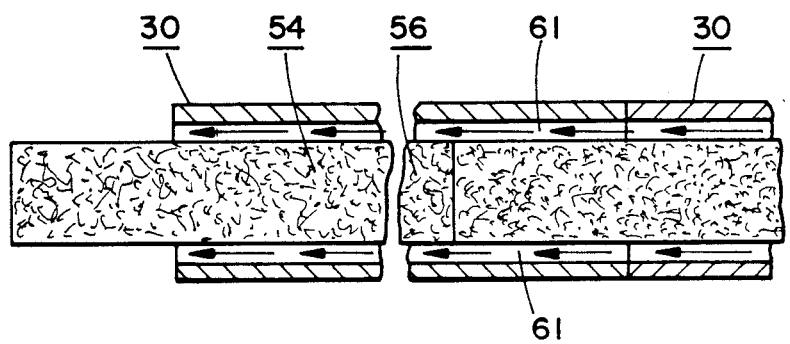
FIG. 15

CUTTING AND GOUGING ELECTRODE

This is a continuation of copending application Ser. No. 926,197 filed on Nov. 3, 1986, now abandoned.

The present invention relates in general to electrodes preferably made of carbon or carbon combination material and adapted for use in the cutting and gouging of metals.

This application is a continuation of Ser. No. 926,197, filed Nov. 3, 1986 and now abandoned.

It is conventional in the present art of cutting and gouging to utilize a carbon electrode which has a plated copper coating thereon of from three to four thousandths of an inch in thickness in the cutting and gouging of metal. This conventional electrode is normally held in a gun or holder which provides a means for attaching the electrode to a source of electrical power and which holder is also adapted to be connected to a source of pressurized gas most commonly air. The holder or gun provides the necessary orifices to direct the pressurized air along one side of or completely around the electrode in order to blow or remove molten metal from the area around the tip of the electrode. The molten metal is produced by striking an arc between the tip of the electrode and the metal to be cut or gouged.

In the use of the above-described prior art structures there are disadvantages that result. The pressurized air which exits the gun or holder is at a high pressure which results in a great amount of noise. In addition the pressurized air is inefficiently used because the nozzle from which it exits is at a substantial distance from the place where the air is to be used. Also there is a fair amount of turbulence which also contributes to the inefficiency of the prior art structures. Air under pressure is substantially expensive to produce and air under extreme pressures is a relatively dangerous instrumentality.

The present invention seeks to do away with the disadvantages which have been numerated hereinabove by the use of a structure which includes a carbon rod with an electrically conductive metal covering member which surrounds the carbon and which forms as part of the member or connected to the member at least one high pressure air passage so that air can be transmitted through this passage from one end of the carbon to the other end of the carbon in proximity to where the arc is being produced. Other gases than air may be used but in most instances air is the most economical. The covering referred to is preferably metal however as will be pointed out hereinafter this covering does not necessarily have to be metal but may be of a synthetic resinous material such as polyethylene or polypropylene or might be of a fiberous board or paperlike material. It should be kept in mind that the primary function of the covering described is to perform the function of forming at least in part the conduit to efficiently transport the pressurized air from one end portion of the electrode to the other.

Various embodiments are illustrated which show the formation of the air passage. In one group the passage is formed between the outer surface of the electrode and the inner surface of the covering member which covering member may be of various mechanical shapes.

Advantages of the structure of the present invention is that no special holder or gun of any type is required to provide electrical connection to the electrode. The present invention will work with any means of supplying power to the electrode, for example a standard electrode holder or even a wire clamped to the electrode. The electrode of the present invention provides the advantages of reducing noise and turbulence of the high pressure air and also the advantage that the air exits very close to the point or area where it performs its function. With the present invention less air is needed to produce the same benefits with less expense and the pressurized air is better contained resulting in safer conditions.

Further advantages of the present invention is that one carbon is easily joined to the next carbon as a given carbon is used up in performing its cutting and gouging function and the present electrode structure is conveniently adapted for use in cutting and gouging functions under water.

An additional advantage in the structure disclosed in the present application and where a nonconductive coating or covering is used is the ability to electrically insulate the electrode when the cutting and gouging functions are being performed in a closely confined area, for example at the bottom of a hole in a piece of metal which has a small diameter. The insulating type of covering or sheath performs the function of insulating the electrode from the sides of the hole in the event the operator of the device is unable to hold the electrode still enough to keep it from bumping the sidewalls.

The prior art in U.S. Pat. No. 1,324,337 issued Dec. 9, 1919 discloses a cutting and gouging apparatus which includes an electrode with an axially extending hole which extends the full length through the electrode. This construction is described in the patent as being designed for use in underwater cutting and gouging situations. The disadvantage of this electrode structure over that disclosed herein is that the air under pressure which travels down this opening in many circumstances is equalized on all sides as it exits the electrode resulting in a situation where at times the molten metal is incapable of being removed by the air exiting the central opening. This circumstance will arise, for example, when one is attempting to gouge in the area of a corner in a rectangular configuration. If the electrode is held at a given angle to the corner the air exiting the electrode will not function to remove the metal or in many circumstances will not function very efficiently. The air in the structure of the present invention does not exit axially of the electrode but either on one side or on several sides of the axis of the electrode and so therefore this disadvantage cannot result in the present invention. Additionally, it is extremely expensive to produce the structure of that shown in U.S. Pat. No. 1,324,337 because it cannot be conveniently molded and it is very expensive to drill or otherwise produce the hole. Additionally the insulated covering version of the present invention is extremely more functional in its cutting and gouging function as accomplished in salt water in that it insulates the electrical flow in that salt water is a conductor.

U.S. Pat. No. 3,458,681 is a disclosure of an electrode for use in arc welding, as distinguished from cutting and gouging, and includes as its teaching an electrode necessarily constructed of both a metal portion and a carbon portion. As a primary teaching, one or more gas passages extend axially through the carbon portion similar to U.S. Pat. No. 1,324,337, and an inert gas is supplied to the weld area through these gas passages. This gas is supplied at a very low pressure at a very low rate to assist in preventing oxidization at the weld. In contrast the present invention deals with cutting and gouging where air is supplied at high pressure (i.e. 50 psi) and at a high rate (i.e. 5 cubic ft. 1/min.). In the present invention only carbon is used in the electrode with a metal portion being unnecessary or undesirable. In the disclosure of U.S. Pat. No. 3,458,681 (FIG. 7) there is a gas channel formed by the combination of a wrapping member and the combination of the carbon and metal rod. However, this differs from the present disclosure because of use of only a carbon member surrounded by a metal or insulation member with the gas passage formed only by the walls of the carbon and covering member.

In U.S. Pat. No. 3,458,681 the carbon and wrapping layer do not extend the same length as the metal rod. This avoids blowing the molten metal out of the weld. In the present invention (FIG. 1) when the electrode is being used the carbon member and the covering member are about the same length because the arc burns both at the same time to keep them the same length.

Other objects and a fuller understanding of this invention may be had by referring to the following description and claims, taken in conjunction with the accompanying drawings, in which:

FIGS. 11-12 are views similar to the views of FIGS. 5-10, however these views illustrate carbons with cross sections which are other than circular and which illustrate an outer covering member which is circular in its cross sectional configuration;

FIG. 13 is a view similar to FIG. 5 but illustrating the covering member as made of a plastic or paper type material;

FIG. 14 is a view showing a rectangular shaped electrode with about half of the shape occupied by the carbon and the other half the air passage.

FIG. 15 is an enlarged fragmentary view of the joint between two electrodes of the invention as shown in FIG. 2;

FIG. 16 is a view similar to FIG. 5 but showing the covering member with a sleeve portion which closely covers the carbon and prevents the air which travels in the air passages from coming into contact with the carbon.

Figure 1:
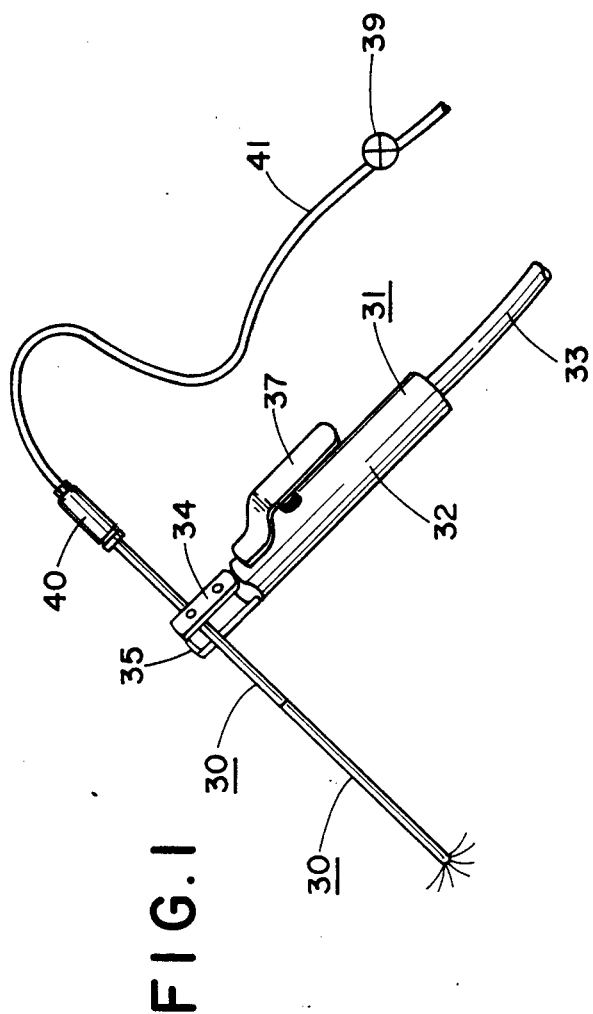
FIG. 1 is an isometric view illustrating the electrode construction of the present invention as held in a standard electrode or rod holder and as attached to a fitting which supplies air under pressure to the electrode construction.

FIG. 1 is an isometric view showing the use of the electrode structure 30 made in accordance with the teachings of the present invention. In FIG. 1 there are shown two electrode structures 30 attached in end to end relationship and these structures are illustrated as being held by a conventional electrode holder 31 which includes a body 32 through which extends an electrical power cord 33 which is electrically connected to a movable jaw 34 and a fixed jaw 35. The jaws 34 and 35 serve to secure or hold the electrodes 30 so that they can be appropriately manipulated by an operator of the device and they serve to provide electrical connection to the electrode structures. A lever 37 is operably connected to the movable jaw 34 so as to open the jaws 34 and 35. Release of the lever 37 causes the jaws (by springs not shown) to continually grip the carbon. An air fitting 40 is connected to the rearward extreme end of the connected electrodes and is for the purpose of supplying air under pressure to the connected members in a manner which will be more fully detailed hereinafter. The power cord is connected to a source of DC energy in a manner well known to those skilled in the art and is for the function of providing the electrical energy to produce an arc which is struck between the end of the connected electrodes, remote from the air fitting, and a metal object which is to be cut and/or gouged. The arc that is struck is for the purpose of melting the metal in the area of the arc and as described hereinabove the air under pressure is for the purpose of removing the molten metal by the action of the air pressure on molten metal at the place where it is melted.

Figure 2:
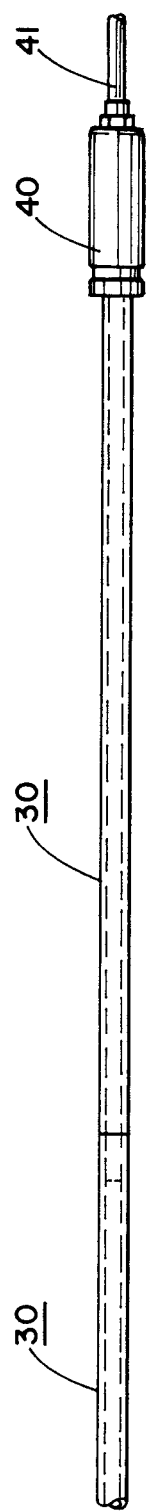
FIG. 2 is an elevational view illustrating two connected electrodes of the present invention and a fitting to supply pressurized air to the construction.

FIG. 2 is an elevational view of two of the connected electrodes 30 and their relative position with respect to the air fitting 40 and an air hose 41 which connects the apparatus and structure to a source of pressurized air (not shown) through an on-off valve 39. It will be noted (FIG. 4) that the forward end of the electrode structure 30 is comprised of a structure wherein a carbon member 53 extends outwardly at a forward portion 54 from a covering member 55 which surrounds the carbon member for most of its longitudinal extent and the carbon portion which extends outwardly is adapted to extend to within the confines of the covering member 55 of a forwardly positioned electrode structure which rearward end of the forwardly electrode structure does not contain a carbon member within the covering member 55. (See FIGS. 3 and 15). In this manner the electrode structures can be continually attached one to the other as a most forwardly electrode structure is consumed by the arc produced by the cutting and gouging operation.

Figure 3:
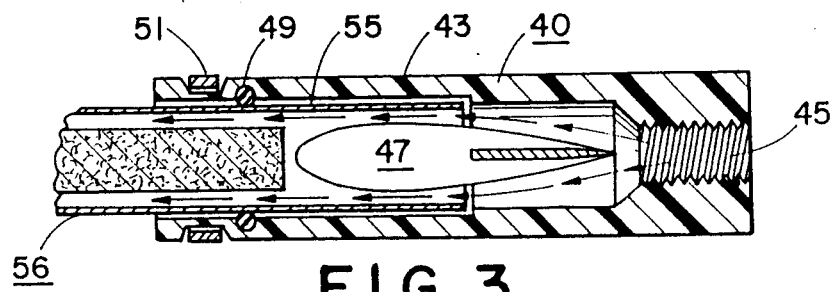
FIG. 3 is an enlarged fragmentary cross-sectional view of the air fitting shown in FIG. 2 illustrating how air is transmitted from the air supply to the electrode construction of the present invention.

FIG. 3 is an enlarged fragmentary view in section illustrating the construction of the air fitting 40. The air fitting 40 includes a housing 43 which has a central bore and at one end there is provided a threaded fitting 45 for receipt of an air hose connection. A centering lug 47 is fixedly mounted in the bore of the housing 43 and is adapted to be received into the rear end portion 56 of an electrode structure where it is surrounded by a covering member 55 and it essentially interfits where carbon is absent in the electrode construction. The interior diameter of the housing at the end opposite the threaded fitting 45 is of a diameter to snuggly receive the outer diameter of the electrode structure as best seen in the drawing. An O-ring 49 assures that no air passes by these mating structures and a clamp device 51 is provided on the exterior diameter of the housing so as to provide a snug engagement of the electrode structure with the air fitting 40. The arrows shown in FIG. 3 show the path of air flow from the fitting into the electrode structure and in a manner which will be more detailed in connection with the structure illustrated particularly in FIGS. 4 and 5.

Figure 4:
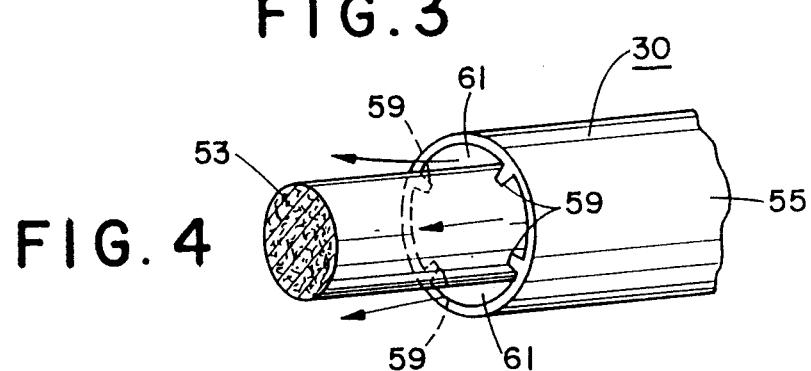
FIG. 4 is an enlarged fragmentary isometric view of one embodiment of the electrode construction of the present invention.
Figures 5, 6, 7:
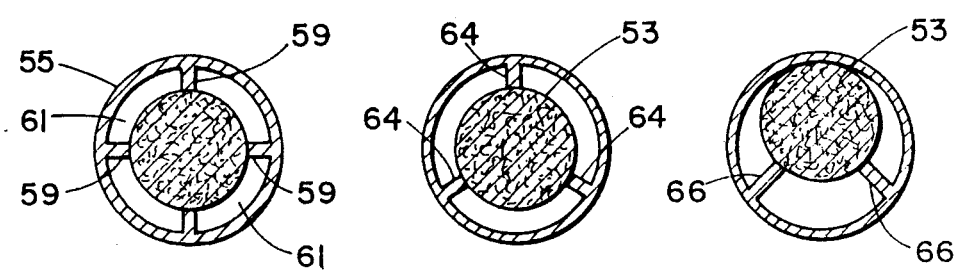
FIG. 5 is a cross-sectional view taken through the construction of FIG. 4.
FIGS. 6-10 are views similar to the view of FIG. 5 showing a carbon which is cylindrical in cross section and showing variations in the configuration of the covering member whereby variations in the shape and size of the air passage or air passages is produced.

FIGS. 4 and 5 illustrate in more detail the electrode structure or carbon rod structure as it is sometimes called which enables the function of the present invention to be carried out. FIG. 4 is an isometric view and illustrates the forward end of a carbon member 53 which is housed within an annular covering member 55. The forward portion 54 of the carbon member and the rear end portion 56 of the carbon is preferably although not necessarily squared off as illustrated in FIGS. 3, 4 and 15 of the drawings. The covering member 55 is provided with four struts all identified by the reference numeral 59 with the inner extremities of the struts 59 being of a dimension to engage the exterior surface of the carbon member 53 in a tight fashion so that under normal circumstances the covering member 55 and the carbon member 53 will not move axially or longitudinally with respect to each other. The sizing of the two heretofore-described members provides four air passages identified by the reference numeral 61 and these air passages are formed between adjacent struts, the inner diameter of the covering member, and the exterior surface of the carbon member. These passages 61 extend for the entire length of the covering member 55 and carbon member 53 where these two members are axially coextensive with each other. Put in other words the air passages extend from the rear end of the structure as illustrated in FIGS. 3 and 15 at the termination of the carbon member 53 to the forward end up to the point where the carbon member exits the covering member 55. See FIG. 4.

In use, the carbon rods or electrodes are preferably connected together as illustrated in FIGS. 1, 2 and 15 and are gripped by the electrode holder 31 as illustrated. The air fitting 40 has been attached to the rear end of the most rearwardly electrode or carbon structure in the manner illustrated and an air supply is connected to the air fitting through the valve 39. An electrical power supply is connected by way of the power cord 33 and an arc is struck between the extreme forward end of the most forwardly electrode which arc melts the metal where the arc has been struck and the continuous flow of the air under pressure removes the molten metal in manner well known to those skilled in the art.

FIGS. 6–10 of the drawings show and illustrate variations in the electrode or carbon rod structures all in accordance with the teachings of the present invention. FIG. 6 is quite similar to FIG. 5 differing only in that there are three struts provided as distinguished from the four struts of FIG. 5. For purposes of differentiation these three struts in FIG. 6 have been illustrated by the reference numeral 64. FIG. 7 is similar to the structure shown in FIGS. 5 and 6 except in this circumstance only two struts 66 have been illustrated. In the structure of FIG. 7 the circumference of the carbon member engages the inner surface of the covering member at a position essentially diametrically opposed to the position where the struts engage the covering member.

Figures 8, 9, 10:
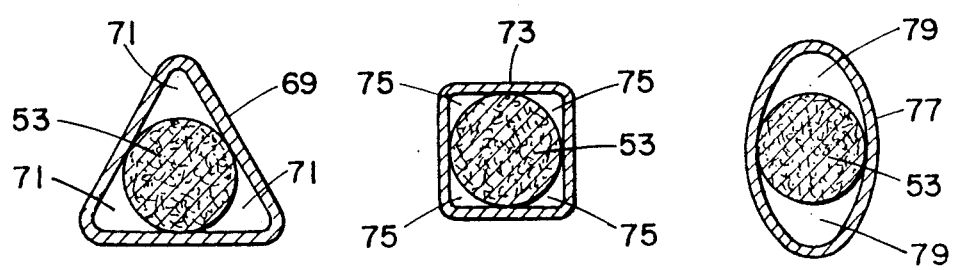

FIG. 8 illustrates the use of a carbon member 53 in combination with a covering member 69 which is triangular in configuration. In this arrangement as illustrated in the drawing the circumference of the carbon engages the covering member at three spaced positions which are spaced about 120 degrees apart thereby defining three axially extending air passages all identified by the reference numeral 71 in this figure. FIG. 9 is similar to FIG. 8 except that a rectangularly shaped covering member 73 is illustrated in conjunction with the carbon 53. In this particular instance the carbon member engages the covering member at four positions spaced 90 degrees between adjacent engagements and this serves to provide four air passages all indicated by the reference numeral 75.

FIG. 10 illustrates the carbon member 53 in conjunction with an elliptically shaped covering member 77. In this particular structure the elliptically shaped covering member 77 engages the carbon at two positions spaced 180 degrees from each other thereby defining two air passages both identified by the reference numeral 79.

FIGS. 11–12 illustrate carbon rod or member configurations which are other than circular in cross-sectional configuration and serve to illustrate how carbons of other shapes can be used in accordance with the teachings of the present invention.

FIG. 11 illustrates a carbon 90 which is triangular in configuration and which utilizes a circular covering member 92 as shown and the physical dimensions of the triangularly shaped carbon member is such that the points of the triangle engage the inner surface of the covering member 92 at 120 degree spaced intervals thereby providing three air passages all of which have been identified by the reference numeral 94.

FIG. 12 shows a carbon 107 which has a cross-sectional shape generally circular in configuration with a chordal segment removed which in combination with the covering member 109 provides a single air passage 111 which extends along only one side of the carbon. This configuration is substantially the reverse of the configuration illustrated in FIG. 12 and described hereinabove.

FIG. 13 is like FIG. 5 but instead shows a plastic or paper material covering member 130.

FIG. 14 illustrates a carbon 132 which is generally rectangular in shape and which is contained within a covering member 133 which is larger in cross-sectional area as shown in this figure and which forms an air passage 134 having about the same cross sectional area as the carbon 132. Projections 135 extending from the inner surface of the covering member serve to hold the carbon in position within the covering members. The electrode structure of FIG. 14 operates in principle in the same manner as the electrode structures previously described.

FIG. 16 illustrates an electrode structure similar to that illustrated in FIG. 5 of the drawings. In this figure the carbon has been identified by the reference numeral 137 and the covering member by the reference numeral 138. Four struts 139 extend from the inner surface of the outer portion of the covering member to an annular portion 140 and these serve to define four air passages 141.

The carbon member is not technically pure carbon but is a combination of carbon and graphite materials which may be for the sake of example of a construction and composition such as that described in U.S. Pat. No. 3,131,290. The covering members which have been shown and disclosed herein may be of a metallic material, a plastic material or other materials such as paper or fiberboard type. It should be kept in mind that the primary function of the covering member is to, at least in part, form the air passages which transmit air from one end of an electrode or assembled plurality of electrodes to the other end where the cutting and gouging operation is being effected. In the event that a metal member is being used it is preferable to use an aluminum or steel material and one might use less desirably a copper material. In the event a plastic material or synthetic resinous material is to be used suitable examples would be polyethylene and polypropylene or similar materials. The additional materials that might be used and suggested above would be various types of paper materials including corrugated board, fiberboard and the like.

Air under pressure has been described as being the desired fluid to be used however it will be understood by those skilled in the art that gasses other than air might be used to bring about essentially the same functional result and included in the other usable gases would be any of the inert gases and it would be additionally be possible to use oxygen if burning was to be enhanced in some way shape or form. In point of fact if it were desirable and a given set of circumstances dictated, it would be possible to conduct a liquid material down the passages which are formed as above-described and in many instances a suitable liquid would be water.

It will therefore be seen from the above-detailed description that the objects of the invention are quickly and conveniently carried out. Air passages are provided as described by the unique combinations disclosed hereinabove which provide that any type of conventional rod holder can be utilized with the transmission of air from one end of a connected electrode assembly with no turbulence and with substantial noise reduction. Additional advantages are that less air is needed thereby reducing the total cost and also reducing the danger factor from the use of air under high pressure. It will be seen that electrical power can be applied to the assembled electrodes at any place along the axial length thereof to bring about the desired results in the cutting and gouging operation. The advantages pointed out hereinabove of providing the air passage at the circumference of the electrode assembly as distinguished from an axially hole drilled to the middle of the carbon is apparent from the a review of the above-described structures and the function that they perform. It will be apparent also from a review of the description and drawings that with the structures shown and disclosed that as a given carbon is consumed that a new carbon can be conveniently attached by inserting the forward end of the new carbon into the rear portion of the given carbon and inserting the rear end of the new carbon into the air fitting 40. It will also be appreciated by those skilled in the art that with a structure like FIG. 12 care must be exercised to rotationally align the air passages so that a continuous passage is effected the entire length of the connected electrodes.

FIG. 15 illustrates the connection of two of the electrode structures of the present invention such as shown in FIGS. 4 and 5 and flow of air as illustrated by the arrows. It will be appreciated by those skilled in the art that the connection between the carbons might be more similar to that illustrated in U.S. Pat. No. 3,512,034 issued May 12, 1970.

The carbons and the covering members can be produced in a variety of ways and it would be preferable to produce the carbon in the manner presently employed by those skilled in the art. With respect to the covering member, whether it be made of metal, plastic material or paper it would be preferable to extrude the covering member and sever the extruded cross-sectional shape at desired intervals for example 12-inch intervals and with a length commensurate with the length of the carbon produced. The carbon is then pushed axially into the covering member to produce a structure in which there is tight engagement between the inner circumference of the covering member and the outer circumference of the carbon member. This places the parts into the condition illustrated in the drawings and described hereinabove. It is of course theoretically possible to co-extrude the covering member with the carbon member and with sophisticated severing means to sever the formed or co-extruded devices to the desired length and in a form shown in the drawings.

As a matter of example only, and for a teaching of the present invention to those skilled in the art, a desirable or functional dimensional shape looking at a cross section of the assembly as in FIG. 5, one may use a 3/8 inch diameter carbon in which case one would desirably have an air space all the way around of about 1/16 inch and with a metal thickness of preferably 1/32 inch. This would result in a total diameter of the assembly of 9/16 inch. These dimensions obviously may be varied for the purpose of bringing about the advantages and functional characteristics hereinabove described.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A carbon electrode structure for carbon arc cutting and gouging including a longitudinally extending carbon member, an annular metal covering member surrounding said longitudinally extending carbon member, a plurality of circumferentially spaced and generally radially extending ribs extending from the inner surface of said covering member to the outer surface of said carbon member to form at least one longitudinally extending air passage between adjacent ribs.

2. A carbon electrode structure for carbon arc cutting and gouging including a longitudinally extending carbon member, an annular metal covering member surrounding said longitudinally extending carbon member with said covering member being polygonal in shape and engaging the outer surface of said carbon member whereby a longitudinally extending air passage is formed between the covering member and the outer surface of said carbon member.

3. A structure as claimed in claim 2 wherein said covering member surrounding said carbon member is generally triangular in cross-section with at least two areas of the triangle engaging said carbon member to form longitudinally extending air passages.

4. A structure as claimed in claim 3 wherein each side of the triangle engages said carbon member to form longitudinally extending air passages.

5. A structure as claimed in claim 2 wherein said metal covering member surrounding said carbon member is generally rectangular in cross-section with at least two sides of the rectangle engaging said carbon member to form longitudinally extending air passages.

6. A carbon electrode structure for carbon arc cutting and gouging including a longitudinally extending carbon member, an annular metal covering member surrounding said longitudinally extending carbon member, said covering member surrounding said carbon member being elliptical in cross-section with two areas of the ellipse engaging said carbon member to form longitudinally extending air passages.

7. A carbon electrode structure for carbon arc cutting and gouging including a longitudinally extending carbon member, an annular metal covering member surrounding said longitudinally extending carbon member, said carbon member being generally triangular in cross-section with the apexes of the triangular carbon member engaging the annular metal covering member to form air passages between the inner surface of the covering member and the outer surface of said carbon member.

8. A carbon electrode structure for carbon arc cutting and gouging including a longitudinally extending carbon member, an annular metal covering member surrounding said longitudinally extending carbon member, said carbon member being generally circular in cross-section with a portion of the circle removed as by or in the direction of a chord and said covering member being circular in cross-section and of the size to closely receive the circular carbon member whereby an air passage is formed between the inner surface of said covering member and the outer surface of said carbon member at the location of said cord.

9. A carbon electrode structure for carbon arc cutting and gouging including a longitudinally extending carbon member, an annular covering member surrounding said longitudinally extending carbon member, said covering member being constructed of a synthetic plastic material or a paper construction and being generally circular in cross-section with air passages formed between the inner surface of the covering member and the outer surface of said carbon member.

10. A structure as claimed in claim 9 wherein said carbon member is generally circular in cross-section.

11. A structure as claimed in claim 10 wherein a plurality of circumferentially spaced and generally radially extending ribs extend from the inner surface of said covering member to the outer surface of said carbon member to form at least one longitudinally extending air passage between adjacent ribs.

* * * * *